United States Patent
Nakazawa et al.

(10) Patent No.: US 6,717,795 B2
(45) Date of Patent: Apr. 6, 2004

(54) ELECTRIC DOUBLE-LAYER CAPACITOR, AND PROCESS FOR PRODUCING THE SAME

(75) Inventors: Yutaka Nakazawa, Miyagi (JP); Ryuichi Kasahara, Miyagi (JP); Koji Sakata, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 10/284,205

(22) Filed: Oct. 31, 2002

(65) Prior Publication Data

US 2003/0095372 A1 May 22, 2003

(30) Foreign Application Priority Data

Nov. 1, 2001 (JP) .................................. 2001-336489

(51) Int. Cl.[7] .................................................. H01G 9/00
(52) U.S. Cl. ........................................ 361/502; 361/503
(58) Field of Search ................................ 361/502–522; 29/25.03

(56) References Cited

U.S. PATENT DOCUMENTS 6,377,441 B1  4/2002  Ohya et al.

2002/0191369 A1 * 12/2002 Nakazawa et al. .......... 361/502
2003/0081372 A1 *  5/2003 Nakazawa et al. .......... 361/502

FOREIGN PATENT DOCUMENTS

| JP | 11-80448 A | 3/1999 |
| WO | WO 98/40435 A1 | 9/1998 |
| WO | WO 99/02585 A1 | 1/1999 |

* cited by examiner

Primary Examiner—Dean A. Reichard
Assistant Examiner—Eric Thomas
(74) Attorney, Agent, or Firm—Sughrue Mion, PLLC

(57) ABSTRACT

An electric double-layer capacitor includes a cell structure constituted by laminating basic cells in series with their collectors serving as connections. Each of the basic cells includes a pair of collectors, a separator disposed between the collectors, and a pair of polarizable electrodes which are disposed between the collectors and the separator and in which an electrolytic solution is contained. The capacitor further includes lead terminal/electrode plate assemblies each having an electrode plate electrically connected to the collectors at opposite ends of the cell structure. Each of the collectors includes a matrix made of an elastomer having a hardness Hs in a range of about 55 (inclusive) to lower than about 85 at ambient temperature, and conductive particles dispersed in the matrix. Thus, in the electric double-layer capacitor, a lower ESR can be realized at in initial stage and even after the service for a long period.

7 Claims, 11 Drawing Sheets

(a)

(b)

ELECTRIC DOUBLE-LAYER CAPACITOR, AND PROCESS FOR PRODUCING THE SAME

BACKGROUND OF THE INVENTION

1. Field of the Invention

The present invention relates to an electronic double-layer capacitor, and a process for producing the same.

2. Description of the Related Art

An electric double-layer capacitor is conventionally put to practical use as a capacitor in which a high capacity on the order of farad (F) can be provided without being accompanied by a chemical reaction and which is strong to the charging and discharging of large electric current and to a charging/discharging cycle.

In recent years, a new application of such an electric double-layer capacitor as an auxiliary power source or the like of a small-sized electronic device such as a mobile phone and the like by utilizing the feature of the electric double-layer capacitor. A further reduction in size and a further increase in capacity of the electric double-layer capacitor are required.

Such an electric double-layer capacitor includes a basic cell comprising a pair of collectors, a separator disposed between the collectors, and a pair of polarizable electrodes each of which is disposed between each of the collectors and the separator and in which an electrolytic solution is contained. The collectors provided at opposite ends of a laminated-cell structure made by laminating the basic cells or the collectors of the basic cells as connections in series are electrically connected to electrode plates included in lead terminal/electrode plate assemblies, so that they are charged from and discharged to the outside.

The capacity of the cell structure can be changed easily by changing the number of the basic cells connected in series and hence, the electric double-layer capacitor is comprised of the laminated-cell structure in many cases rather than the single basic cell.

The basic cell can be produced using a producing process disclosed, for example, in U.S. Pat. No. 6,377,441 by Ohya and others.

Among the components of the basic cell, the collector has functions to encapsulate the electrolytic solution and to provide an electric conductivity, and may be a conductive film formed from an insulating resin and a conductive material in many cases. In general, materials disclosed in PCT/JP98/01021 by Tsukakoshi and others and in PCT/JP98/03073 by Akita and others can be used as a material suitable for the collector. The thickness of the collector is about 0.2 mm, but in recent years, a thinner film having a thickness of several tens $\mu$m has been started to be used in order to meet the need for a reduction in size of the components.

The use of the electric double-layer capacitor as a variety of small-sized electronic devices such as an auxiliary power source for a mobile phone and the like is expected, but an electric double-layer capacitor existing presently suffers from the following two problems in respect of equivalent series resistance (which will be referred to as ESR hereinafter) of a product, i.e., an initial inferiority of ESR and a deterioration in ESR with the passage of time.

(1) There are many products having an initial ESR larger than a practical level. The ESR value is dispersed largely among products, resulting in a degraded yield.

(2) If a product having a small initial ESR has been put in service for a long period, its ESR is increased remarkably and for this reason, such product cannot be put in service (a long-term reliability is poor).

In a case of a thin collector film, particularly, the deterioration in ESR with the passage of time is significant, which is an obstacle to the real employment of the electric double-layer capacitor to an application expected.

The capacitor is used in wider applications such as an integrated circuit, a backup power source, a coupling circuit, a high-frequency circuit and the like, but the ESR is an important factor governs the overall characteristic in each of the applications. Therefore, it is desired that the ESR value is extremely small and stabilized. Particularly, when the electric double-layer capacitor is used in an application as a power source, a larger capacity and a lower ESR value are considered as ideal.

The ESR is governed mainly by a loss resistance of a dielectric material in a lower frequency range and mainly by a resistance of the component itself constituting the capacitor and a resistance between the components in a higher frequency range. What attention is paid to is particularly factors associated in the higher frequency range, which include (a) a resistance of the collector itself (material), (b) a resistance of the electrode plate itself (material), (c) a state of contact between the basic cells (between the collectors), and (d) a state of contact between the outermost collector of the cell structure and the electrode plate.

Among them, particularly, (c) and (d) are issues of consideration.

SUMMARY OF THE INVENTION

Accordingly, it is a first object of the present invention to provide an electric double-layer capacitor and a process for producing the same, wherein the problems associated with the above-described conventional electric double-layer capacitor can be solved, and a lower ESR value can be realized at an initial stage and after the service of the capacitor for a long period.

It is a particular object of the present invention to provide an electric double-layer capacitor and a process for producing the same, wherein the state of contact between the basic cells is good at the initial stage after the manufacture and after the service of the capacitor for a long period.

It is another particular object of the present invention to provide an electric double-layer capacitor comprising a single basic cell and a process for producing the same, wherein the state of contact between the collector and the electrode plate included in the lead terminal/electrode plate assembly is good at the initial stage after the manufacture and after the service of the capacitor for a long period.

To achieve the above objects, according to a first aspect and feature of the present invention, there is provided an electric double-layer capacitor comprising a cell structure constituted by laminating basic cells in series with their collectors serving as connections, each of the basic cells including a pair of collectors, a separator disposed between the collectors, and a pair of polarizable electrodes which are disposed between the collectors and the separator and in which an electrolytic solution is contained; and lead terminal/electrode plate assemblies each having an electrode plate electrically connected to the collectors at opposite ends of the cell structure, each of the collectors including a matrix made of an elastomer having a hardness Hs in a range of about 55 (inclusive) to lower than about 85 at ambient temperature, and conductive particles dispersed in the matrix.

With such configuration, the hardness of the elastomer included in the collector is in the above-described range and hence, the collector is difficult to deform by the pressure of a transmission gas resulting from the gasification of the electrolytic solution, and it is difficult to create voids in an interface between both of the collectors. Therefore, the state of contact between the basic cells is good at the initial stage after the manufacture and after the service of the capacitor.

According to another aspect and feature of the present invention, there is provided an electric double-layer capacitor, comprising a basic cell including includes a pair of collectors, a separator disposed between the collectors, and a pair of polarizable electrodes which are disposed between said collectors and said separator and in which an electrolytic solution is contained; and lead terminal/electrode plate assemblies each including an electrode plate electrically connected to each of the collectors of the basic cell; the collector including a matrix formed of an elastomer having a hardness Hs in a range of about 55 (inclusive) to lower than 85 at ambient temperature, and conductive particles dispersed in the matrix; and a conductive bond layer being interposed between each of the electrode plates and each of the collectors electrically connected to the electrode plate, the conductive bond layer including a matrix formed of an elastomer having a hardness Hs in a range of about 60 (inclusive) to lower than 85 at ambient temperature, and conductive particles dispersed in the matrix.

With the above configuration, since the collector and the conductive bond layer have the above-described configures, the conductive bond layer is difficult to deform by the pressure of the transmission gas resulting from the gasification of the electrolytic solution, and it is difficult to create voids in an interface between the collector and the conductive bond layer. Therefore, the state of contact between the outermost collector of the cell structure and the electrode plate is good at the initial stage after the manufacture and after the service of the capacitor.

According to a further aspect and feature of the present invention, there is provided a process for producing an electric double-layer capacitor, comprising the steps of laminating a plurality of basic cells in series one on another with their collectors serving as connections, each of the basic cells including a pair of collectors, a separator disposed between both of the collectors, and a pair of polarizable electrodes which are disposed between the collectors and the separator and in which an electrolytic solution is contained; forming conductive bond layers on surfaces of electrode plates of a pair of lead terminal/electrode plate assemblies; bringing the conductive bond layers on the electrode plates and the collectors forming opposite ends of the laminate of the basic cells into abutment against each other; and pressing the laminate so that the pair of electrode plates are clamped.

In the electric double-layer capacitor produced by the producing process having such feature, voids are difficult to create in an interface between both of the collectors and an interface between the collector and the conductive bond layer, and the capacitor has a good ESR characteristic at an initial stage and even after the service for a long period.

According to a yet further aspect and feature of the present invention, there is provided a process for producing electric double-layer capacitor, comprising the steps of forming conductive bond layers on surfaces of electrode plates of a pair of lead terminal/electrode plate assemblies; bringing the conductive bond layers formed on the surfaces of the electrode plates into abutment against surfaces of a basic cell outside the collectors; and pressing the resulting laminate so that the electrode plates are clamped.

In the electric double-layer capacitor produced by the producing process having such feature, voids are difficult to create in an interface an interface between the collector and the conductive bond layer, and the capacitor has a good ESR characteristic at an initial stage and even after the service for a long period.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment with reference to the accompanying drawings.

Figure 1:
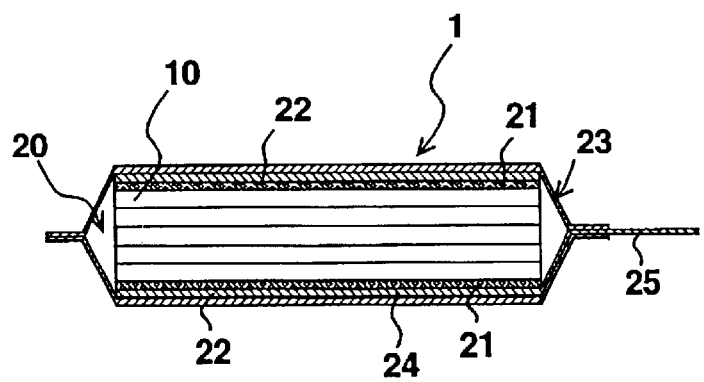
FIGS. 1a and 1b are sectional views showing the structures of the electric double-layer capacitor and a basic cell according to the present invention.
Figure 1:
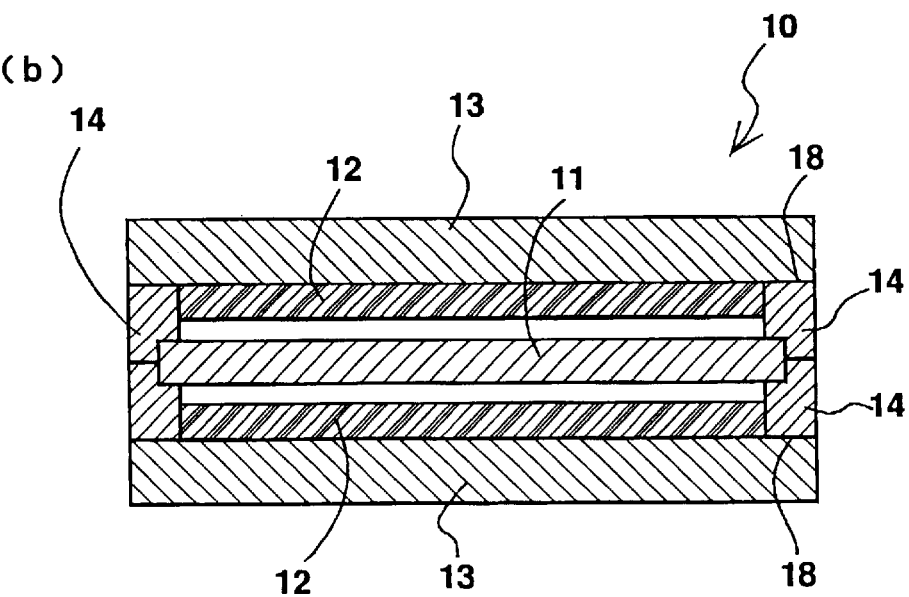

FIG. 1a shows the configuration of an electric double-layer capacitor 1 comprising five basic cells 10 laminated one on another, and FIG. 1b shows the configuration of a basic cell 10 which is one element for an electric double-layer capacitor.

As shown in FIG. 1a, the electric double-layer capacitor is comprised of a cell structure 20 constituted by sequentially laminating the basic cells 10, a lead terminal/electrode assembly 22 comprising an electrode plate 24 and a band-shaped lead terminal 25, and an sheathing package 23.

As shown in FIG. 1b, the basic cell 10 includes a pair of collectors 13, 13, a separator 11 disposed between the collectors 13, 13, and a pair of polarizable electrodes 12, 12 which are disposed between the collectors 13, 13 and the separator 11 and in which an electrolytic solution is contained. Further, frame-shaped gaskets 14 are disposed to create a pair of closed space for incorporation of the polarizable electrodes 12, 12 together with the collectors 13 and the separator 11.

The collector 13 included in the basic cell 10 constituting the cell structure 20 includes a matrix formed of an elastomer having a hardness Hs in a range of about 55 (inclusive) to lower than about 85 at ambient temperature, and conductive particles dispersed in the matrix.

The term "hardness Hs" used herein means an instantaneous value of an A-type defined by JIS K6301, and in the present patent application, the hardness is standardized by JIS K6301.

In addition, the term "ambient temperature" indicates a general range of temperature in an industrial production site and means a range of 10 to 30° C.

With regard to such a phenomenon that the collector 13 and a conductive bond layer 21 are deformed, the mechanical strength of the matrix particularly at a high temperature in a range of 60 to 70° C. also becomes an issue of consideration. However, there is a correlation between the loading endurance and the hardness of the matrix, and there is also a correlation between the hardness of the matrix and the hardness of the starting material in a temperature range of ambient temperature to 70° C. Therefore, the characteristic of the collector at a high temperature is defined by defining the hardness of the starting material at ambient temperature as in the present invention.

Since the starting material for the matrix constituting the collector 13 is the elastomer having the hardness Hs in the range of about 55 (inclusive) to lower than about 85 at ambient temperature, the surfaces of the bonded collectors 13, 13 are deformed moderately to compensate for the unevenness thereof. Therefore, the area of the interface between the collectors 13, 13 is increased, and the creation of voids in the interface is inhibited. In addition, the bonded collectors 13, 13 have a moderate hardness and hence, are not deformed even by the pressure of a transmission gas.

In this way, the collectors 13, 13 in the cell structure having the above-described configuration are bonded in good bonded states in the interface therebetween and hence, the initial ESR in the electric double-layer capacitor is low and less varied with the passage of time.

The good bonded states of the collectors 13, 13 will be described below in further detail with reference to FIG. 9.

Figure 9:
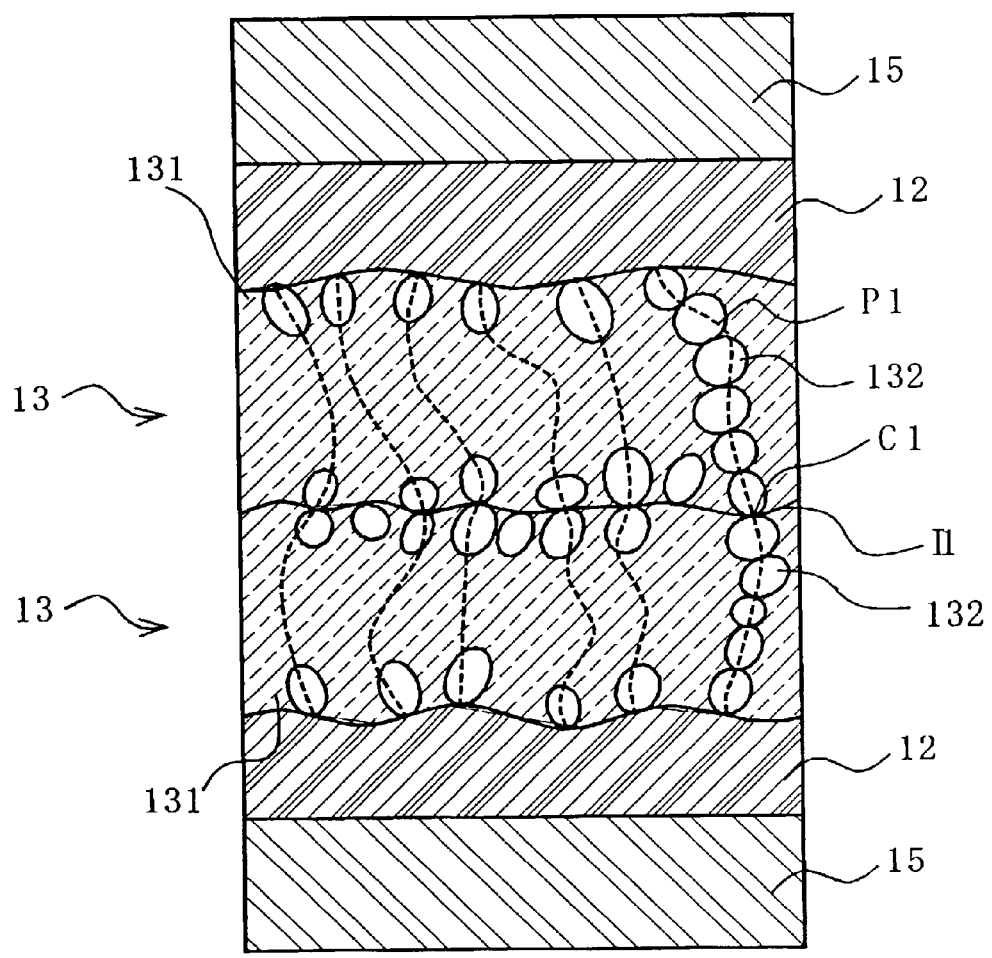
FIG. 9 is a sectional view rationally showing a good state of contact in an interface between collectors in the electric double-layer capacitor.

Referring to FIG. 9, the two collectors 13, 13 are bonded to each other with a surface outside the basic cell 10 in non-contact with the electrolytic solution 15 being an interface I1.

In the interface I1, the electric conduction between the two basic cells is ensured by conductive particles 132 in the collector 13, e.g., carbon particles. More specifically, the collector 13 has a section where the conductive particles 132 are dispersed in a matrix 131 formed of the elastomer in such a manner that they are connected together in rows, and a section where the particles at opposite ends of such connection in rows are partially exposed to the electrolytic solution and to the outside of the collector 13.

Between the two basic cells, the sections where the conductive particles 132 connected in the rows are exposed to the outside of the collectors 13 are in contact with each other, whereby an electric conduction path P1 is established through such contact points C1.

However, the contact only at one point is insufficient for the mutual connection of the basic cells. The good bonded state means that a sufficient electric contact has been ensured. The good bonded state is realized by (1) increasing the points of contact of the conductive particles exposed as described above to the utmost and (2) making many conduction paths.

In FIG. 9, many contact points are present in the interface I1, and a large number of electric conduction paths are present and hence, the good bonded state is established.

The conductive particles defining the electric conduction paths other than the electric conduction path P1 at a right end in FIG. 9 are partially omitted in FIG. 9.

On the other hand, if the hardness of the starting material is lower than about 55, the collector 13 is deformed remarkably by the pressure of a transmission gas resulting from the gasification of the electrolytic solution. The electric double-layer capacitor is used in wider applications and hence, a range of service temperature thereof is also as wide as −30 to 70° C. In near a higher temperature, particularly, a highest temperature (60 to 70° C.) in a preset service temperature range, the gasification of the electrolytic solution is promoted, and the pressure of the gas is raised and in addition, there is a tendency that the matrix resin of the collector 13 is also softened, resulting in a reduction in mechanical strength. In this case, there is an increased risk that the gas resulting from the electrolytic solution is transmitted through the inside of the collector 13, and the pressure of the transmission gas is applied to the interface between the collectors 13, 13, whereby the interface between the collectors 13, 13 is deformed, and slight voids are created in such deformed portion.

Further, the gas resulting from the electrolytic solution is transmitted through the resin portion which is the matrix of the collector. In the recent thin electric double-layer capacitor, however, the gas resulting from the electrolytic solution is transmitted more easily, resulting in a remarkable reduction in ESR, because the collector is thinner and in the form of a film.

If the hardness is equal to or higher than about 85, the surfaces of the collectors 13 are deformed moderately and for this reason, it is difficult to provide an effect of preventing the creation of voids in an interface between such surfaces.

Figure 11:
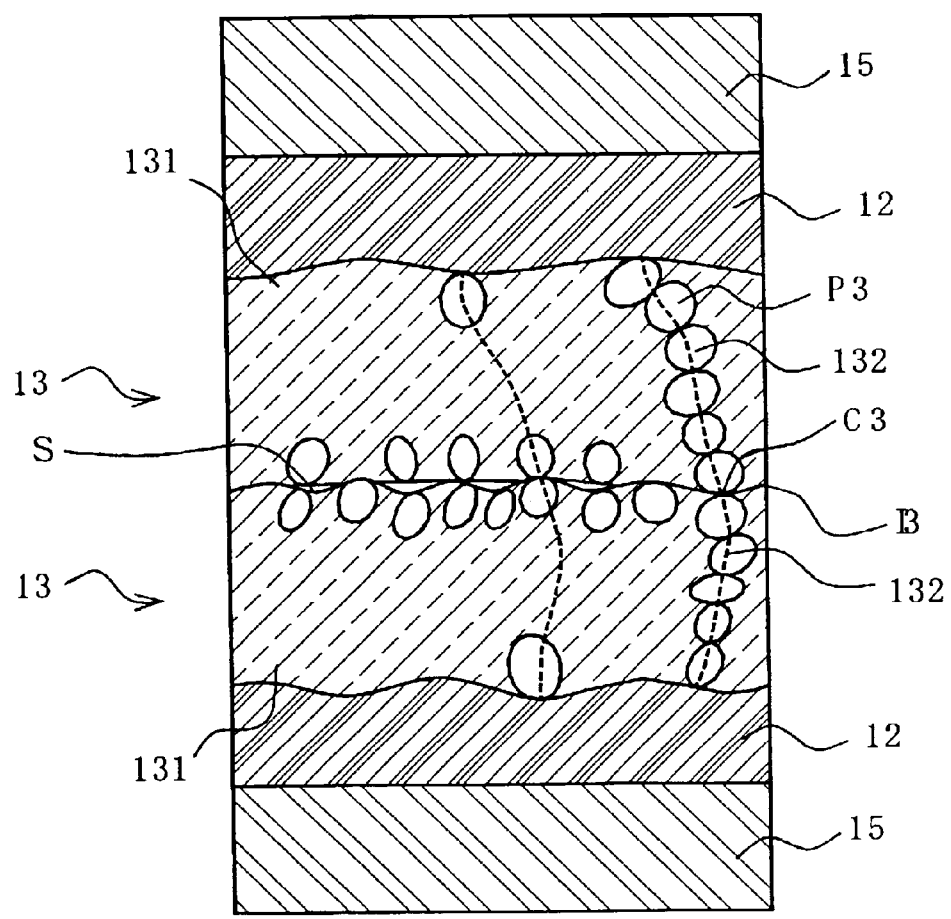
FIG. 11 is a sectional view rationally showing a state in which voids are present in the interface between the collectors in the electric double-layer capacitor.

FIG. 11 is a sectional view rationally showing a state in which voids are present in an interface between collectors in an electric double-layer capacitor.

Two collectors 13, 13 are bonded in such a manner that surfaces outside basic cells 10 which are not in contact with polarizable electrodes 12 containing the electrolytic solution 15 form an interface I3.

The number of points of mutual contact of the conductive particles exposed is decreased and as a result, the number of the electric conduction paths is decreased as compared with that in FIG. 9.

Preferable examples of the starting resin including an olefin resin for the collector are thermoplastic elastomers such as styrene-ethylene-butylene-styrene block copolymer (SEBS), a styrene-ethylene-propylene-styrene block copolymer (SEPS), an ethylene-propylene rubber (EPM) and the like. However, the present invention is particularly not limited by the description of them.

Examples of particles for the collector, which may be used, are a carbon filler, a graphite filler, a fine metal powder, electrically-insulating particles coated with a conductive material and the like.

A plurality of, e.g., five the basic cells 10 having the collectors are laminated together to form a cell structure 20, thereby forming an electric double-layer capacitor 1, as shown in FIG. 1a.

The electric double-layer capacitor 1 includes, in addition to the cell structure 20, a lead terminal/electrode assembly 22, and a sheathing package 23 made of a composite laminate film formed of aluminum and a resin. The lead terminal/electrode assembly 22 includes an electrode plate 24 which is electrically connected to the collectors at opposite ends of the cell structure 20, and a lead terminal 25 which is drawn out of the sheathing package 23. The electrode plate 24 is formed by plating a solder or tin on a surface of copper.

A conductive bond layer 21 is interposed between the electrode plate 24 and each of the collectors at the opposite ends of the cell structure electrically connected. It is desirable that the conductive bond layer 21 includes a matrix formed of an elastomer having a hardness Hs at ambient temperature in a range of about 60 (inclusive) to lower than about 85, and conductive particles dispersed in the matrix.

By using the elastomer having the hardness Hs at ambient temperature in a range of about 60 (inclusive) to lower than about 85 as a starting material for the matrix constituting the conductive bond layer, a good bonded state is realized in the interface between the conductive bond layer 21 and the collector 13 in the cell structure. Therefore, the electric double-layer capacitor having such configuration has an ESR which is lower at an initial stage and less varied with the passage of time.

The good bonded state between the collector 13 and the conductive bond layer 21 will be described below in detail with reference to FIG. 10.

Figure 10:
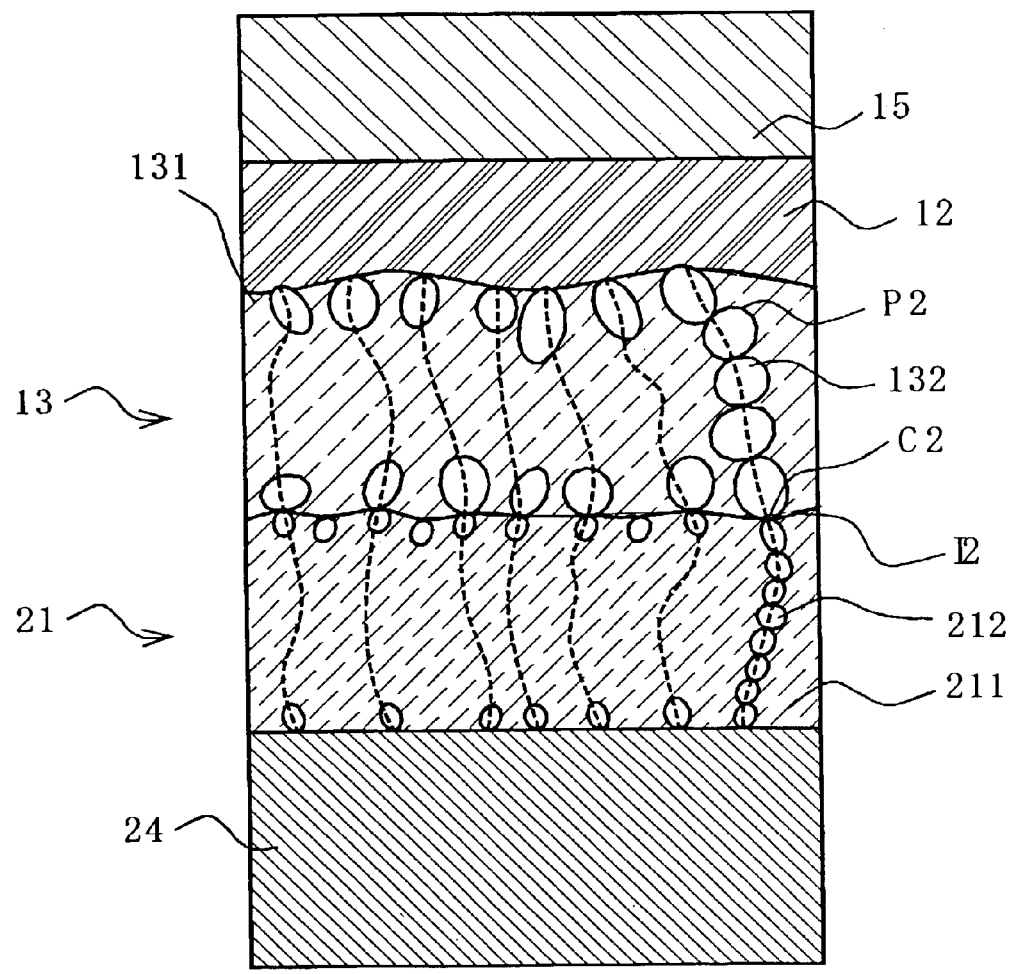
FIG. 10 is a sectional view rationally showing a good state of contact in an interface between the collector and a conductive bond layer in the electric double-layer capacitor.

According to the present invention, the conductive bond layer 21 is formed on the electrode plate 24 in such a manner that conductive particles 212 are dispersed in a matrix 211, as shown in FIG. 10.

As in the collector 13, some of the conductive particles 212 are connected together in rows in the matrix 211 in such a manner that the conductive particles at one of ends of such a connection are exposed to the interface 12, and the conductive particles at the other end are in contact with the electrode plate 24.

The conductive particles 212 exposed to the interface I2 are in contact with the conductive particles 132 connected in the rows in the collector 13 at points C2, thereby defining electric conduction paths P2 extending from the electrode plate 24 to the polarizable electrode 12 containing the electrolytic solution 12.

The conductive particles defining the electric conduction paths other than the electric conduction path P2 at a right end in FIG. 10 are also partially omitted in FIG. 10.

If the hardness of the starting material is lower than about 60, the conductive bond layer 21 is deformed remarkably by the pressure of a transmission gas resulting from the gasification of the electrolytic solution. On the other hand, if the hardness is equal to or higher than about 85, the surface of the conductive bond layer 21 is deformed moderately and for this reason, it is difficult to provide an effect of preventing the creation of voids in the interface between the conductive bond layer 21 and the collector 13.

It is also desirable that the absolute value of a difference between the hardness Hs of the matrix of the collector 13 at ambient temperature and the hardness Hs of the matrix of the conductive bond layer 21 at ambient temperature is smaller than about 30.

As a result of provision of such configuration, the matrix of the collector 13 and the matrix of the conductive bond layer 21 have similar characteristics in respect of mechanism characteristics and hence, the collector 13 and the conductive bond layer 21 are deformed in the interface 12 to the same extent and thus, voids are difficult to create in the interface. Therefore, a good bonded state is realized in the interface I2 between the collector and the conductive bond layer, and the electric double-layer capacitor having such configuration has an ESR which is lower at the initial stage and which is less varied with the passage of time.

On the other hand, if the absolute value of the difference in hardness Hs at ambient temperature between the collector 13 and the conductive bond layer 21 is equal to or larger than about 30, voids are liable to be created in the interface.

Further, in the relationship in hardness Hs at ambient temperature between the starting materials, it is preferable that the hardness of matrix of the conductive bond layer 21 is higher than that of the collector 13. In the electric double-layer capacitor having such configuration, the conductive bond layer is less varied at a pressing step which will be described hereinafter and hence, the ESR is lower at an initial stage and less varied with the passage of time.

If the glass transition point of the material for the matrix of each of the collector 12 and the conductive bond layer 21 is in a range of about −60° C. and about 0° C., then the hardness Hs of the material at ambient temperature is in a range of about 55 to about 80 and hence, such material is appropriate in the present invention.

The material for the matrix of the conductive bond layer 21, which may be used, for example, may be a silicone rubber, a butyl rubber or the like, but a fluoro-elastomer which is an elastomer containing fluorine is particularly desirable. Examples of the fluoro-elastomers are a vinylidene fluoride based resin, a fluoro-silicone based resin, a polytetrafluoroethylene (PTFE) and the like.

The conductive bond layer 21 having an excellent strength at a high temperature can be produced by using such material. This conductive bond layer is difficult to deform even by the pressure of a transmission gas resulting from the gasification of the electrolytic solution.

Examples of the conductive particles for the conductive bond layer 21 are a carbon filler, a graphite filler, a fine metal powder, electrically-insulating particles coated with a conductive material and the like.

The cell structure 20 comprising the five basic cells laminated one on another for the electric double-layer capacitor 1 has been described above in the present embodiment, but a single basic cell may be used to produce an electric double-layer capacitor in which two collectors of the basic cell are electrically connected to electrode plates 24 of lead terminal/electrode plate assemblies 22 with conductive bond layers 21 interposed therebetween. In this case, it is desirable that the electric double-layer capacitor has a configuration which will be described below, whereby the ESR value is lower at the initial stage and less varied with the passage of time.

Each of the collectors 13, 13 includes a matrix formed of an elastomer having a hardness Hs at ambient temperature in a range of about 55 (inclusive) to lower than about 85, and conductive particles dispersed in the matrix. The conductive bond layer 21 includes a matrix formed of an elastomer having a hardness Hs at ambient temperature in a range of about 60 (inclusive) to lower than about 85, and conductive particles dispersed in the matrix.

By the fact that the electric double-layer capacitor has such collectors 13, 13 and such conductive bond layers 21, voids are difficult to create in the interface between the collector 12 and the conductive bond layer 21.

In addition, it is desirable that the absolute value of a difference in hardness Hs at ambient temperature between the matrix of the collector 13 and the matrix of the conductive bond layer 21 is smaller than about 30.

As a result of provision of such configuration, the matrix of the collector 13 and the matrix of the conductive bond layer 21 have similar characteristics in respect of mechanism characteristics and hence, the collector 13 and the conductive bond layer 21 are deformed in the interface 12 to the same extent and thus, voids are difficult to create in the interface. Therefore, a good bonded state is realized in the interface I2 between the collector and the conductive bond layer.

On the other hand, if the absolute value of the difference in hardness Hs at ambient temperature between the collector 13 and the conductive bond layer 21 is equal to or larger than about 30, voids are liable to be created in the interface.

Further, in the relationship in hardness Hs at ambient temperature between the starting materials, it is preferable that the hardness of matrix of the conductive bond layer 21 is higher than that of the collector 13. In the electric double-layer capacitor having such configuration, the conductive bond layer is less varied at a pressing step which will be described hereinafter and hence, the ESR is lower at an initial stage and less varied with the passage of time.

If the glass transition point of the material for the matrix of each of the collector 12 and the conductive bond layer 21 is in a range of about −60° C. and about 0° C., then the hardness Hs of the material at ambient temperature is in a range of about 55 to about 80 and hence, such material is appropriate in the present invention.

The material for the matrix of the conductive bond layer 21, which may be used, for example, may be a silicone rubber, a butyl rubber or the like, but a fluoro-elastomer which is an elastomer containing fluorine is particularly desirable. Examples of the fluoro-elastomers are a vinylidene fluoride based resin, a fluoro-silicone based resin, a polytetrafluoroethylene (PTFE) and the like.

The conductive bond layer 21 having an excellent strength at a high temperature can be produced by using such material. This conductive bond layer is difficult to deform even by the pressure of a transmission gas resulting from the gasification of the electrolytic solution.

Examples of the conductive particles for the conductive bond layer 21 are a carbon filler, a graphite filler, a fine metal powder, electrically-insulating particles coated with a conductive material and the like.

Figure 2:
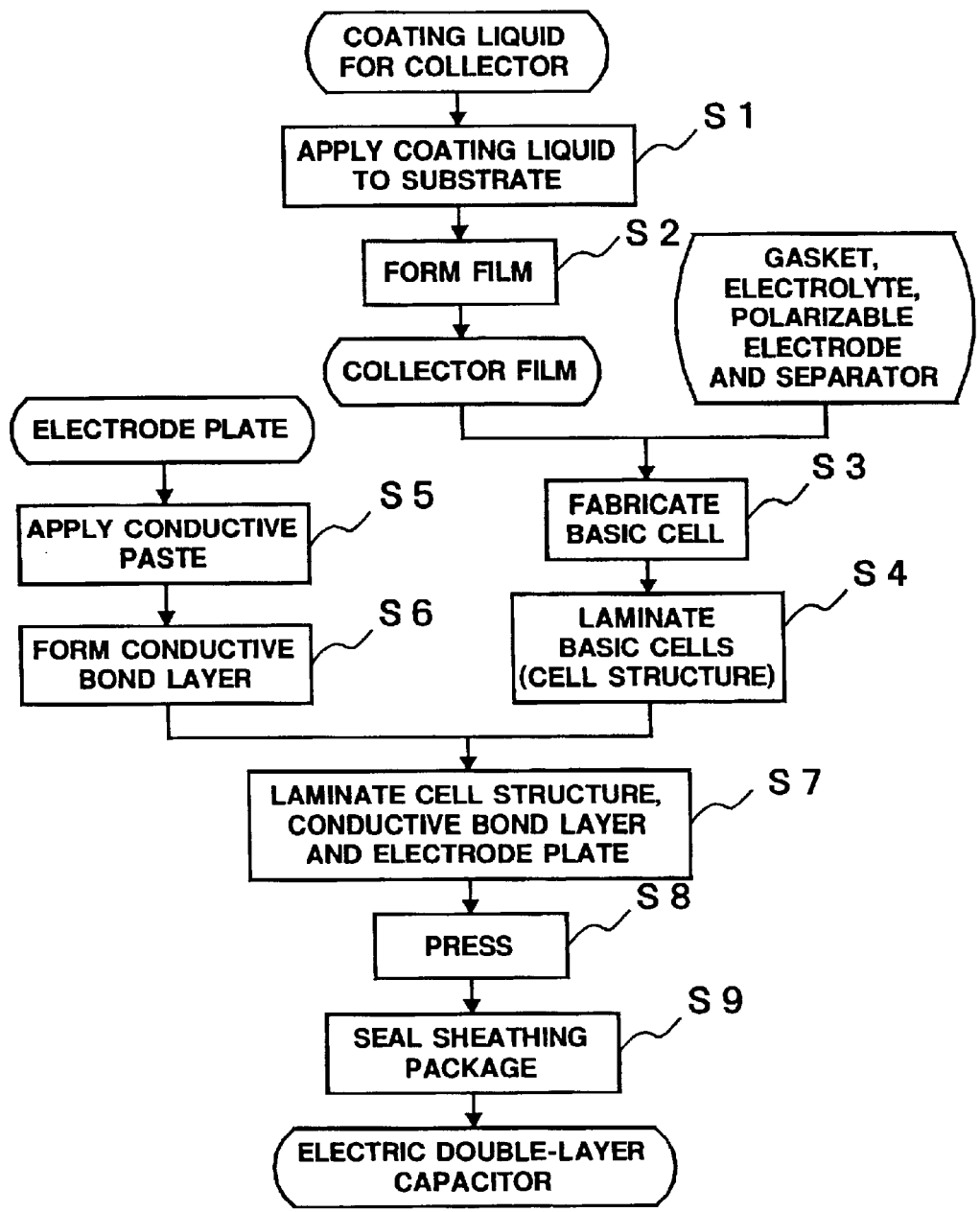
FIG. 2 is a flow chart showing essential steps of a process for producing an electric double-layer capacitor according to the present invention.

A process for producing an electric double-layer capacitor will be described with reference to FIG. 2.

At Step S1, first, a starting resin including an olefin resin, conductive particulate material and a solvent are mixed to produce a coating liquid for a collector at Step S1. It this case, it is desirable from the viewpoint of a handleability that the mixing ratio which is a weight of the resin divided by a weight of the conductive particulate material is in a range of about 1.7 to about 2.5.

One appropriate example of the starting resin including the olefin resin for the collector is a thermoplastic elastomer such as a styrene-ethylene-styrene block copolymer (SEBS), a styrene-ethyleneepropylene-styrene block copolymer (SEPS), an ethylene-propylene rubber (EPM) and the like. However, the present invention is particularly not limited by the description of them.

The conductive particulate material which may be used for the collector is, for example, a carbon filler, a graphite filler, a fine metal powder, electrically-insulating particles coated with a conductive material and the like.

The solvent, which may be used for the coating liquid, is, for example, a ketone such as a methyl ethyl ketone, an alcohol such as an isopropyl alcohol, an ether such as a diethyl ether, a furan such as a tetrahydro furan and the like. However, the present invention is particularly not limited by the description of them.

Then, the coating liquid for the collector is applied onto a substrate such as a PET film by a coater. The application is carried out in a usual manner, for example, by use of a bar coater, a roll coater or the like. The thickness of the coated film (thickness of the collector) is controlled by regulating the distance between the coater and the substrate, the viscosity of the coating liquid, the amount of coating liquid supplied and the like.

At Step S2, the collector coating liquid applied is subjected to a stoving/film-forming treatment, whereby the solvent is removed by heating from the coating liquid to form a collector film (a collector 13).

The collector film formed in the above manner is of a structure in which conductive particles have been dispersed moderately in a matrix formed of an elastomer made of the starting resin crosslinked.

It is desirable that a starting material for the matrix of the collector is an elastomer having a hardness Hs at ambient temperature in a range of about 55 (inclusive) to lower than about 85.

A good bonded state is realized at an interface between collectors in a cell structure by using the elastomer having a hardness Hs at ambient temperature in the range of about 55 (inclusive) to lower than about 85 as the starting material for the matrix constituting the collector 13. Therefore, an electric double-layer capacitor having such configuration has an ESR which is lower at an initial stage and which is less varied with the passage of time.

If the hardness of the starting material is lower than about 55, the collector 13 is remarkably deformed under the action of the pressure of a transmission gas resulting from the gasification of an electrolytic solution. On the other hand, if the hardness is equal to or higher than 85, surfaces of the collectors 13 are deformed moderately and for this reason, it is difficult to provide an effect of preventing the creation of voids in an interface between such surfaces.

With regard to such a phenomenon that the collector 13 and a conductive bond layer 21 are deformed, the mechanical strength of the matrix particularly at a high temperature in a range of 60 to 70° C. becomes an issue of consideration. However, there is a correlation between the loading endurance and the hardness of the matrix, and there is also a correlation between the hardness of the matrix and the hardness of the starting material in a temperature range of ambient temperature to 70° C. However, the deformation of the collector at a high temperature is defined by defining the hardness of the starting material at ambient temperature.

At Step S3, a basic cell 10 having a configuration shown in FIG. 1b is fabricated by combining the collector film (collector 13), a gasket 14, an electrolytic solution 15, a polarizable electrode 12 and a separator 11 with one another.

The description in the present embodiment is carried out using the basic cell 10 having the configuration shown in FIG. 1b. However, the basic cell 10 may be of another configuration, if it includes, at least, a pair of collectors 13, a separator 11 disposed between both of the collectors 13, and a pair of polarizable electrodes 12 disposed between the collectors 13 and the separator 11 and containing the electrolytic solution 15. Therefore, the basic cell 10 may be of a structure in which the gasket 14 and the collector may be in a different bonded relation to each other, for example, a side face of the collector 13 is in close contact with the gasket 14.

Before or after this assembling step, the collector 13 is peeled off from the substrate.

In the lamination, it is desirable that the collectors in the multi-layer cell are bonded to each other without formation of voids in an interface between the collectors.

It is desirable that the collector 13 is assembled so that its surface in contact with the substrate forms an outer surface of the basic cell 10 and is a joint surface bonded to another basic cell 10 or the conductive bond layer 21.

The shape of a surface of a PET film used as the substrate is smoother than that of a surface of the collector 13 produced at Step S2, and a uniform quality of the substrate is provided in a lot or between lots. Therefore, a surface of the collector 13 opposed to a substrate for a collector 13 resulting from transferring of such substrate is also smooth, and any of these parts is substantially uniform. By using such surface as a surface bonded to another basic cell 10 or a conductive bond layer 21, the bonded state of the collector 13 is good and uniform.

At Step S4, a number of the basic cells necessary depending on a required capacity of a capacitor are laminated one on another to form a cell structure 20.

In the lamination, it is desirable that the collectors to be bonded in the cell structure are bonded to each other without formation of voids in an interface therebetween.

Thus, the surfaces of the collectors are brought into close contact with each other with no voids in the interface therebetween, as shown in FIG. 9, thereby many points of contact between the conductive particles exposed on the surface of each collector. Therefore, the electric double-layer capacitor having such configuration has an ESR lower at an initial stage.

In the above description, the plurality of basic cells have been laminated, but a single basic cell may be used. In this case, subsequent steps can be carried out in a manner similar to that described above, and there is an effect equivalent to that provided in the cell structure 20 resulting from the lamination of the basic cells.

At Step S5, a conductive bond layer 21 is formed on one surface of an electrode plate 24 of a lead terminal/electrode plate assembly 22 separately from the cell structure 20.

More specifically, first, a conductive paste made by kneading a binder resin, a conductive particulate material and a solvent with one another is prepared.

Desirably, a starting material for the binder resin includes a material which will become an elastomer upon formation of the conductive bond layer. For example, a silicone rubber or a butyl rubber may be used, but a fluoro-elastomer which is an elastomer containing fluorine is particularly desirable. Examples of the fluoro-elastomer are a fluorovinylidene-based resin, a fluorosilicone-based resin, a polytetrafluoro-ethylene (PTFE) and the like.

As a result of provision of such configuration, the conductive bond layer is excellent in strength at a high temperature and is difficult to deform even by the pressure of a transmission gas resulting from the gasification of the electrolytic solution.

The conductive particulate material which may be used for the conductive bond layer is, for example, a carbon filler, a graphite filler, a fine metal powder, electrically-insulating particles coated with a conductive material and the like.

The solvent, which may be used for the coating liquid, is, for example, a ketone such as a methyl ethyl ketone, an alcohol such as an isopropyl alcohol, an ether such as a diethyl ether, a furan such as a tetrahydro furan and the like. However, the present invention is particularly not limited by the description of them.

The mixing ratio of the binder resin, the conductive particulate material and the solvent in the conductive paste is suitable to be in a range of about 5 to about 20 about 30 to about 55: about 30 to 44 in terms of weight.

Such paste is applied onto the surface the electrode plate 24 of the lead terminal/electrode plate assembly 22. An applying means is similar to that used at the step of applying the collector coating liquid onto the substrate such the PET film.

At Step S6, the conductive paste applied is heated, whereby the solvent is gasified and removed to form a conductive bind layer 21 on the electrode plate 24.

If the stage of gasifying and removing the solvent is not carried out, then the solvent is left in the conductive bond layer 21, and the left solvent erodes the matrix of the collector, or is gasified in a pressing treatment which will be described thereinafter, resulting in a failure of bonding.

The conductive bond layer 21 thus produced is of a structure in which conductive particles have been dispersed moderately on a matrix formed of the binder resin crosslinked.

It is desirable that a starting material for the matrix is an elastomer having a hardness Hs at ambient temperature in a range of about 60 (inclusive) to lower than about 86.

A good bonded state is realized at an interface between the conductive bond layer 21 and the collector in a cell structure by using the elastomer having a hardness Hs at ambient temperature in the range of about 60 (inclusive) to lower than about 85 as the starting material for the matrix constituting the conductive bond layer. Therefore, an electric double-layer capacitor having such configuration has an ESR which is lower at an initial stage and which is less varied with the passage of time.

If the hardness of the starting material is lower than about 60, the conductive bond layer is deformed remarkably by the pressure of a transmission gas resulting from the gasification of the electrolytic solution. On the other hand, if the hardness is equal to or higher than about 85, a surface of the conductive bond layer 21 is deformed moderately and for this reason, it is difficult to provide an effect of preventing the creation of voids in an interface between the conductive bond layer 21 and the collector 13.

It is desirable that the absolute value of a difference between the hardness Hs of the matrix of the collector 13 and the hardness Hs of the matrix of the conductive bond layer 21 at ambient temperature is lower than about 30.

As a result of provision of such configuration, the matrix of the collector 13 and the matrix of the conductive bond layer 21 have similar properties in respect of mechanical properties and hence, the collector and the conductive bond layer are deformed to the same extent in the interface therebetween, whereby it is difficult for voids to be created in the interface. Therefore, the good bonded state is realized at the interface between the collector and the conductive bond layer, and the electric double-layer capacitor having such configuration has an ESR which is lower at an initial stage and which is less varied with the passage of time.

On the other hand, if the absolute value of the difference between the hardness Hs of the collector 13 and the hardness Hs of the conductive bond layer 21 at ambient temperature is equal to or higher than about 30, voids are liable to be created in the interface.

Further, in the relationship of hardness at ambient temperature between the starting materials, it is preferable that the hardness of the matrix of the conductive bond layer 21 is higher than that of the collector 13. In the electric double-layer capacitor having such configuration, the conductive bond layer is less deformed at the pressing step which will be described hereinafter and hence, has an ESR which is lower at the initial stage and which is less varied with the passage of time.

If the glass transition point of the material for the matrix of each of the collector 13 and the conductive bond layer 21 is in a range of about 60° C. to about 0° C., the hardness Hs thereof at ambient temperature is in a range of about 55 to about 88. Therefore, such material is suitable in the present invention.

At Step S7, the cell structure 20 and the lead terminal/electrode plate assembly 22 are laminated on each other, so that the conductive bond layer 21 is in contact with the outermost collector 13 in the cell structure 20.

In the lamination, it is desirable that the collectors bonded in the cell structure are bonded to each other without formation of voids in the interface therebetween.

As shown in FIG. 10, the surfaces of the collector and the conductive bond layer are in contact with each other with no gap in the interface therebetween, and many points of contact between the conductive particles exposed on the surfaces are ensured. Therefore, the electric double-layer capacitor having such configuration has the ESR lower at the initial state.

At Step S8, the laminate fabricated at Step S7 is subjected to a pressing treatment. The pressing treatment is achieved by pressing the laminate from outside the electrode plates 24, 24 in a direction of a line normal to the contact surface of the collector 13, while warming the laminate.

It is desirable that the pressing treatment is carried out at a surrounding temperature in a range of about 40° C. (inclusive) to about 100° C. (inclusive) and at a pressing force in a range of higher than 0 kPa to about 500 kPa (inclusive).

By employing such producing process, good bonded states are realized in the interface between the collectors 13 and in the interface between the collector 13 and the conductive bond layer 21.

If the surrounding temperature is lower than about 40° C., the fluidity of the matrixes in the interface between the collectors 13 and in the interface between the collector 13 and the conductive bond layer 21 is not sufficient and for this reason, voids are liable to be created. On the other hand, if the surrounding temperature exceeds about 100° C., the collector 13 is softened remarkably, and the leakage of the electrolytic solution from a portion of the collector 13 bonded to the gasket is liable to occur in the basic cell 10.

If the pressing force is 0 kPa, the collectors are not bonded, and the collector and the conductive bond layer are not bonded to each other. For this reason, a target ESR value (e.g., 400 mΩ or less) is not reached, and a slight pressure is requisite. However, if the pressing force exceeds about 500 kPa, the electrolytic solution is leaked from bonded portions of the components in the basic cell and hence, a pressing force value exceeding about 500 kPa is not preferred.

At Step S9, the lead terminal/electrode plate assembly 22 and the cell structure 20 integrated with each other are covered with a sheathing package 23 in an atmosphere depressurized (lower than the atmospheric pressure), and an outer peripheral edge of the sheathing package 23 is thermally fused and sealed over the entire periphery, thereby completing an electric double-layer capacitor 1.

Particular examples will be described below for a good understanding of the invention. These examples show a particular best mode of the present invention, but do not limit the subject matter of the invention.

EXAMPLE 1

A laminated-cell structure was first produced by a producing process which will be described below.

A styrene-ethylene-butylene-styrene block copolymer (SEBS) was used as a starting resin. The copolymer had a hardness Hs in a range of 65 to 80 at 20° C. and a glass transition temperature of −20° C. The starting resin and a conductive particulate material comprising a carbon filler having an average particle size of 50 nm were mixed together at a weight ratio of 100:50. The resulting collector coating liquid was applied to a substrate comprising a PET film having a thickness of 100 μm by a bar coater. The coating liquid on the substrate was heated for 60 minutes at 100° C., whereby methyl ethyl ketone as a solvent was gasified and removed. In this manner, a collector having a size of 3 cm×3 cm and a thickness of 80 μm was produced.

A basic cell was fabricated according to a conventional process without peeling-off of the collector from the substrate. Thereafter, the collector was peeled off from the substrate, so that the surface of the collector opposed to the substrate was outside the basic cell.

The five basic cells produced in the above manner were laminated one on another without voids formed by the collectors in each of the basic cells, thereby providing a cell structure.

On the other hand, a conductive bond layer was formed separately from the cell structure on one surface of an electrode plate of a lead terminal/electrode plate assembly in the following manner.

A vinylidene fluoride-based resin was prepared as a binder resin. The vinylidene fluoride-based resin used in this example had a hardness Hs in a range of 60 to 80 at 20° C. and a glass transition temperature of −30° C. The binder resin, a conductive particulate material comprising a silver powder and a glycol-based solvent were kneaded together at a weight ratio of 20:40:40 to provide a paste.

The paste was applied to a surface of an electrode plate made of a tin-plated copper plate by a bar coater. The paste on the electrode plate was heated for 30 minutes at 150° C.

to gasify and remove the glycol-base solvent, thereby providing a conductive bond layer having a thickness of 80 μm.

Subsequently, the cell structure and the lead terminal/electrode plate assembly were laminated on each other, so that the conductive bond layer was in contact with the outermost collector in the cell structure without voids.

The laminate comprising the cell structure and the lead terminal/electrode plate assembly was pressed for one hour at a surrounding temperature of 60° C. and at a pressing force of 100 kPa.

Thereafter, the lead terminal/electrode plate assembly and the cell structure integrated with each other were covered with a sheathing package in an atmosphere depressurized (lower than the atmospheric pressure), and an outer peripheral edge of the sheathing package was thermally fused and sealed over the entire periphery, thereby providing an electric double-layer capacitor.

EXAMPLE 2

An electric double-layer capacitor was produced in a manner similar to that in Example 1, except that SEBS having a hardness Hs in a range of 60 to 65 at 20° C. was used for a collector.

EXAMPLE 3

An electric double-layer capacitor was produced in a manner similar to that in Example 1, except that SEBS having a hardness Hs in a range of 80 to 85 at 20° C. was used for a collector.

EXAMPLE 4

An electric double-layer capacitor was produced in a manner similar to that in Example 1, except that a vinylidene fluoride-based resin having a hardness Hs in a range of 55 to 60 at 20° C. was used as a binder resin for a conductive bond layer.

EXAMPLE 5

An electric double-layer capacitor was produced in a manner similar to that in Example 1, except that a vinylidene fluoride-based resin having a hardness Hs in a range of 80 to 85 at 20° C. was used as a binder resin for a conductive bond layer.

EXAMPLE 6

An electric double-layer capacitor was produced in a manner similar to that in Example 1, except that a fluorine rubber having a hardness Hs in a range of 60 to 80 at 20° C. was used as a binder resin for a conductive bond layer.

EXAMPLE 7

An electric double-layer capacitor was produced in a manner similar to that in Example 1, except that a pressing force was set at 20 kPa.

EXAMPLE 8

An electric double-layer capacitor was produced in a manner similar to that in Example 1, except that a pressing force was set at 50 kPa.

EXAMPLE 9

An electric double-layer capacitor was produced in a manner similar to that in Example 1, except that a pressing force was set at 500 kPa.

COMPARATIVE EXAMPLE 1

An electric double-layer capacitor was produced in a manner similar to that in Example 1, except that SEBS having a hardness Hs in a range of 50 to 55 at 20° C. was used for a collector.

COMPARATIVE EXAMPLE 2

An electric double-layer capacitor was produced in a manner similar to that in Example 1, except that SEBS having a hardness Hs in a range of 85 to 90 at 20° C. was used for a collector.

COMPARATIVE EXAMPLE 3

An electric double-layer capacitor was produced in a manner similar to that in Example 1, except that a vinylidene fluoride-based resin having a hardness Hs in a range of 55 to 60 at 20° C. was used as a binder resin for a conductive bond layer.

COMPARATIVE EXAMPLE 4

An electric double-layer capacitor was produced in a manner similar to that in Example 1, except that a vinylidene fluoride-based resin having a hardness Hs in a range of 85 to 90 at 20° C. was used as a binder resin for a conductive bond layer.

COMPARATIVE EXAMPLE 5

An electric double-layer capacitor was produced in a manner similar to that in Example 1, except that an epoxy resin having a hardness Hs larger than 100 at 20° C. was used as a binder resin for a conductive bond layer.

COMPARATIVE EXAMPLE 6

An electric double-layer capacitor was produced in a manner similar to that in Example 1, except that two basic cells were laminated on each other, so that a surface opposite from a surface in contact with a substrate in one of the two collectors included in a basic cell was formed as an outer surface of the basic cell at a step of assembling each of the basic cells, and further, the surface in contact with the substrate and the opposite surface were opposed to each other at a step of laminating the basic cells.

COMPARATIVE EXAMPLE 7

An electric double-layer capacitor was produced in a manner similar to that in Example 1, except that surfaces of opposite from surfaces of two collectors included in a basic cell were formed as outer surfaces of the basic cell.

COMPARATIVE EXAMPLE 8

An electric double-layer capacitor was produced in a manner similar to that in Example 1, except that a pressing force was set at 0 kPa.

COMPARATIVE EXAMPLE 9

An electric double-layer capacitor was produced in a manner similar to that in Example 1, except that a pressing force was set at 1,000 kPa.

The samples in Examples and the samples in Comparative Examples were estimated for the bonded states between both of the collectors and between the collector and the conductive bond layer and for the ESR characteristic. Results are given below. Characteristics of the samples in Examples and the samples in Comparative Examples are shown in Table 1.

TABLE 1

|  | Collector | | Conductive bond layer | | Pressing force kPa | Surfaces outside basic cells |
|---|---|---|---|---|---|---|
|  | Material | Hardness Hs | material | Hardness Hs | | |
| Ex. 1 | SERB | 60–80 | VFR | 65–80 | 100 | Two |
| Ex. 2 | SERB | 55–60 | VFR | 65–80 | 100 | Two |
| Ex. 3 | SERB |  | VFR | 60–65 | 100 | Two |
| Ex. 4 | SERB |  | VFR | 55–60 | 100 | Two |
| Ex. 5 | SERB |  | VFR | 80–85 | 100 | Two |
| Ex. 6 | SERB |  | FR | 65–80 | 100 | Two |
| Ex. 7 | SERB |  | VFR | 65–80 | 20 | Two |
| Ex. 8 | SERB |  | VFR | 65–80 | 50 | Two |
| Ex. 9 | SERB |  | VFR | 65–80 | 500 | Two |
| Com. Ex. 1 | SERB |  | VFR | 65–80 | 100 | Two |
| Com. Ex. 2 | SERB |  | VFR | 65–80 | 100 | Two |
| Com. Ex. 3 | SERB |  | VFR | 55–60 | 100 | Two |
| Com. Ex. 4 | SERB |  | VFR | 85–90 | 100 | Two |
| Com. Ex. 5 | SERB |  | ER | >100 | 100 | Two |
| Com. Ex. 6 | SERB |  | VFR | 65–80 | 100 | Two |
| Com. Ex. 7 | SERB |  | VFR | 65–80 | 100 | Two |
| Com. Ex. 8 | SERB |  | VFR | 65–80 | 0 | One and one |
| Com. Ex. 9 | SERB |  | VFR | 65–80 | 100 | Two |

Ex. = Example
Comp. Ex. = Comparative example
VFR = vinylidene fluoride rubber
FR = fluorine rubber
ER = epoxy rubber
"Two" in the column of surfaces outside basic cells means two surfaces which are in contact with substrate
"One and one" in the column of surfaces outside basic cells means one surface which is in contact with basic cell and one surface which is not contact with basic cell Estimation 1

To examine the ESR characteristic, an ESR immediately after the fabrication of the capacitor (an initial ESR) and an ESR (a durability ESR) were measured, and influences of factors were estimated.

Conditions for the test and the measurement of the initial ESR and the durability ESR were as follows:

(A) Initial ESR

The 100 samples (electric double-layer capacitors) fabricated under the same conditions were prepared. ESR of each of them was measured, and a maximum value, a minimum value and an average value were determined. The 100 samples were then subjected to the durability ESR test.

The frequency for the measurement of ESR was set at 1 kHz.

(B) Durability ESR
(i) Long-Term Reliability Test

A voltage of 0.8 V/cell was applied 3,000 hours in an atmosphere at 60° to each of the samples. A rate of variation in ESR (ESR variation rate) x before and after the application of the voltage was calculated, and the long-term reliability (the stability of an electric characteristic in the long-term service) was judged based on the variation rate x.

Results of the judgment of the long-term reliability are represented by characters in correspondence to ranges of numerical values of the ESR variation rates x, as given below.

$x \leq 1.2$: when long-term reliability is very high (S)
$1.2 < x \leq 1.8$: when long-term reliability is high (A)
$1.8 < x \leq 2.5$: when long-term reliability is provided (B)
$2.5 < x \leq 6.0$: when long-term reliability can be expected (C)
$6.0 < x$: when long-term reliability cannot be expected (D)

The frequency for the measurement of ESR was set at 1 kHz.

Temperature Cycle Test

The samples were subjected to 200 cycles of a test in which each of them was exposed to an atmosphere at a temperature cycle given below. A rate of variation in ESR (ESR variation rate) x' before and after the test was calculated, and a temperature cycle resistance (the stability of an electric characteristic against the repeated change in temperature) was judged based on the variation rate x'.

The following temperature cycle was defined as one cycle:
25° C. (for 5 minutes)→30° C. (for 30 minutes)→70° C. (for 30 minutes)→25° C. (for 5 minutes), wherein the numerical value in parentheses indicates a retention time at respective temperature, and a temperature-raising/lowering time is 5 minutes.

Results of the judgment of the temperature cycle resistance are represented by characters in correspondence to ranges of numerical values of the ESR variation rates x', as given below.

$x' \leq 1.2$: when temperature cycle resistance is very high (S)
$1.2 < x' \leq 1.8$: when temperature cycle resistance is high (A)
$1.8 < x' \leq 2.5$: when temperature cycle resistance is provided (B)
$2.5 < x' \leq 6.0$: when temperature cycle resistance can be expected (C)
$6.0 < x'$: when temperature cycle resistance cannot be expected (D)

The frequency for the measurement of ESR was set at 1 kHz.

With regard to the durability ESR, the above-described two types of test were carried out properly for every factor examining items.

Estimation 1: Relationship Between Hardness of Starting Resin for Collector and ESR Characteristic The influence exerted to the ESR characteristic by the hardness of the starting resin for each of the collectors was estimated using the samples in Examples 1, 2 and 3 and Comparative examples 1 and 2.

The initial ESR was measured for each of the fabricated samples (number of 200 for one condition), and these samples were then subjected to the long-term reliability test and the temperature cycle resistance test as the durability ESR test, whereby the durability ESR was measured.

Figure 3:
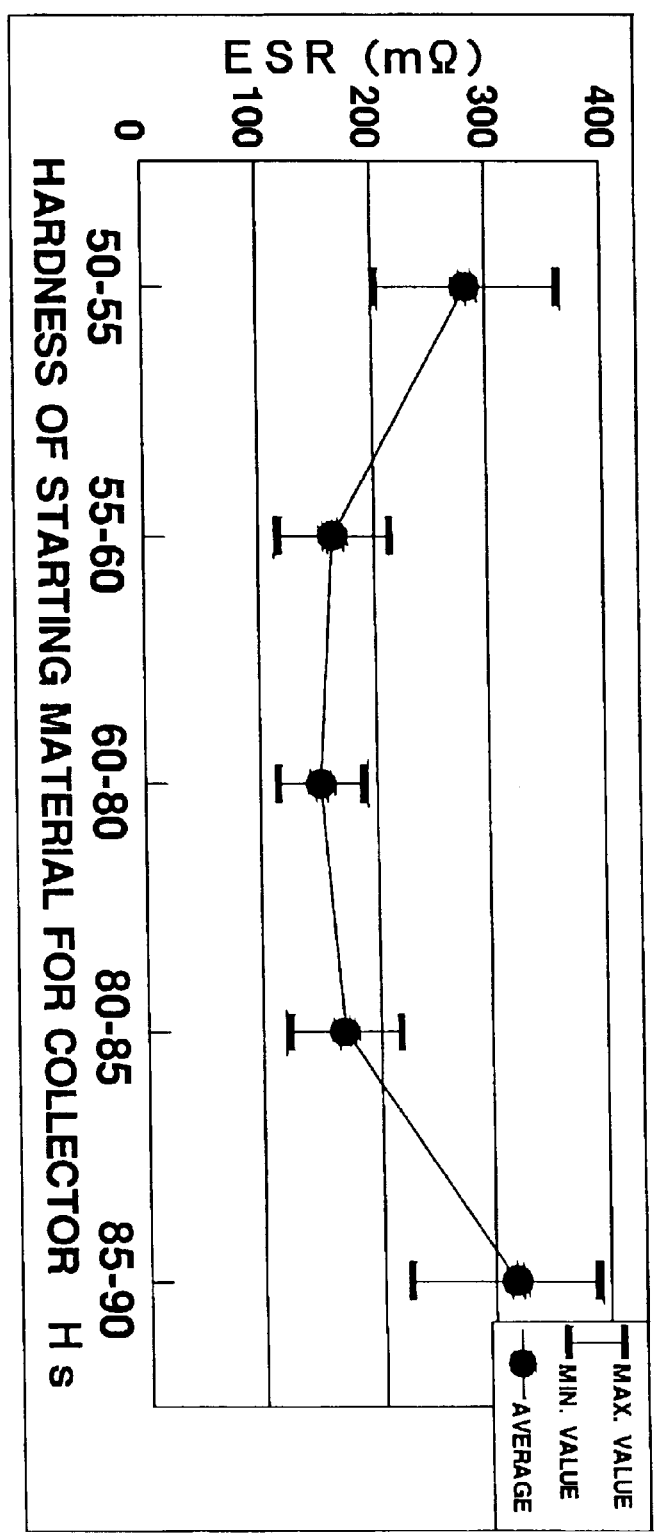
FIG. 3 is a graph showing the relationship between the hardness of a starting material for a collector and the initial ESR in the electric double-layer capacitor according to the present invention.

FIG. 3 shows results of the measurement of the initial ESR, and Tables 2 and 3 show results of the durability ESR.

As for ranges of hardness shown in FIG. 3 and Tables 2 and 3, for example, "55–65" means a range of 55 (inclusive) to smaller than 65, and the same is true in Figures and tables which will be described hereinafter.

As shown in FIG. 3, if the hardness of the starting material was in a range of 55 (inclusive) to smaller than 85, the average value of the initial ESR was 200 mΩ or less. On the other hand, if the hardness was in a range of "50–55" and in a range of "85–90", the average value of the initial ESR exceeded 200 mΩ.

As for the durability ESR, the ESR variation rate in the long-term reliability test shown in Table 2 and the ESR variation rate in the temperature cycle test shown in Table 3 were lower than 2 times at the hardness of the starting material for the collector in a range of 55 (inclusive) to lower than 85, and higher than 4 times at the hardness of the starting material for the collector in a range of "50–55" and in a range of "85–90".

TABLE 2

| Hardness of binder | Result of estimation |
|---|---|
| 50–55 | C (4.83) |
| 55–60 | A (1.21) |
| 60–80 | S (1.06) |
| 80–85 | A (1.42) |
| 85–90 | C (5.81) |

The numeral in parentheses indicates an ESR variation rate after lapse of 3,000 hours

TABLE 3

| Hardness of collector | Result of estimation |
|---|---|
| 50–55 | C (4.79) |
| 55–60 | A (1.36) |
| 60–80 | S (1.08) |
| 80–85 | A (1.56) |
| 85–90 | C (5.72) |

The numeral in parentheses indicates an ESR variation rate after 200 cycles

Estimation 2

The influence exerted to the ESR characteristic by the hardness of the binder in the conductive bond layer was estimated using the samples in Examples 1, 4 and 5 and Comparative examples 3 and 4.

The initial ESR was measured for each of the fabricated samples (number of 200 for one condition), and these samples were then subjected to the long-term reliability test and the temperature cycle resistance test as the durability ESR test, whereby the durability ESR was measured.

Figure 4:
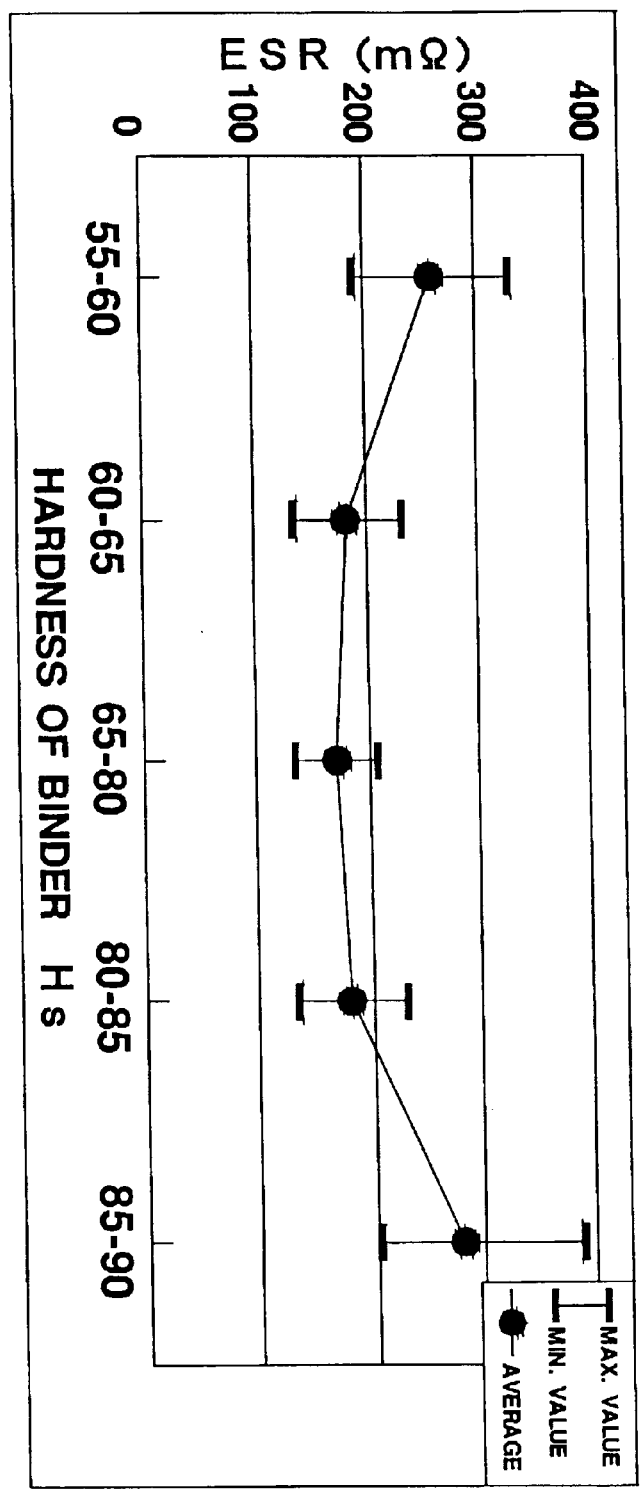
FIG. 4 is a graph showing the relationship between the hardness of a binder for a conductive bond layer and the initial ESR in the electric double-layer capacitor according to the present invention.

FIG. 4 shows results of the measurement of the initial ESR, and Tables 4 and 5 show results of the durability ESR.

As shown in FIG. 4, if the hardness of the starting material was in a range of 55 (inclusive) to smaller than 85, the average value of the initial ESR was 200 mΩ or less. On the other hand, if the hardness was in the range of "50–55" and in the range of "85–90", the average value of the initial ESR exceeded 200 mΩ.

As for the durability ESR, the ESR variation rate in the long-term reliability test shown in Table 4 and the ESR variation rate in the temperature cycle test shown in Table 5 were lower than 2 times at the hardness of the starting material for the collector in the range of 55 (inclusive) to lower than 85, and higher than 4 times at the hardness of the starting material for the collector in the range of "50–55" and in the range of "85–90".

TABLE 4

| Hardness of binder | Result of estimation |
|---|---|
| 55–60 | C (4.62) |
| 60–65 | A (1.23) |
| 65–80 | S (1.03) |
| 80–85 | A (1.37) |
| 85–90 | C (5.85) |

The numeral in parentheses indicates an ESR variation rate after lapse of 3,000 hours

TABLE 5

| Hardness of binder | Result of estimation |
|---|---|
| 55–60 | C (4.72) |
| 60–65 | A (1.34) |
| 65–80 | S (1.09) |
| 80–85 | A (1.53) |
| 85–90 | C (5.11) |

The numeral in parentheses indicates an ESR variation rate after 200 cycles

Estimation 3

The samples, which were produced by the producing process for Examples 1, 4 and 5 and Comparative examples 3 and 4 and which were subjected to a pressing treatment for convenience of the experiment, were subjected to an exposure test in which they were exposed for 500 hours in an atmosphere at 60° C. The estimation was carried out by observing the presence or absence of peeling-off between the outermost collector of the cell structure and the conductive bond layer for the samples after the test and determining an yield for acceptable products free from the peeling-off for each condition.

Table 6 shows results of the estimation.

In a hardness range of "85–90", defective products in which the peeling-off was observed were produced at 10%, and in other hardness ranges, no defective product was produced.

From these results and the results of the ESR characteristic, it can be seen that the interface between the collector and the conductive bond layer resulting from the durability ESR test is not preferred for the electric double-layer capacitor in both of the hardness range of "50–55" and the hardness range of "85–90".

TABLE 6

| Hardness of binder | Number of samples fabricated | Acceptable products (number) | Defective products (number) | Yield (%) |
|---|---|---|---|---|
| 55–60 | 100 | 100 | 0 | 100 |
| 60–65 | 100 | 100 | 0 | 100 |
| 65–80 | 100 | 100 | 0 | 100 |
| 80–85 | 100 | 100 | 0 | 100 |
| 85–90 | 100 | 90 | 10 | 90 |

Estimation 4

The initial ESR was measured for the samples (number of 200 for each condition) in Example 6 and Comparative Example 5, and these samples were then subjected to the long-term reliability test and the temperature cycle test as the durability ESR test, whereby the durability ESR was measured.

Figure 5:
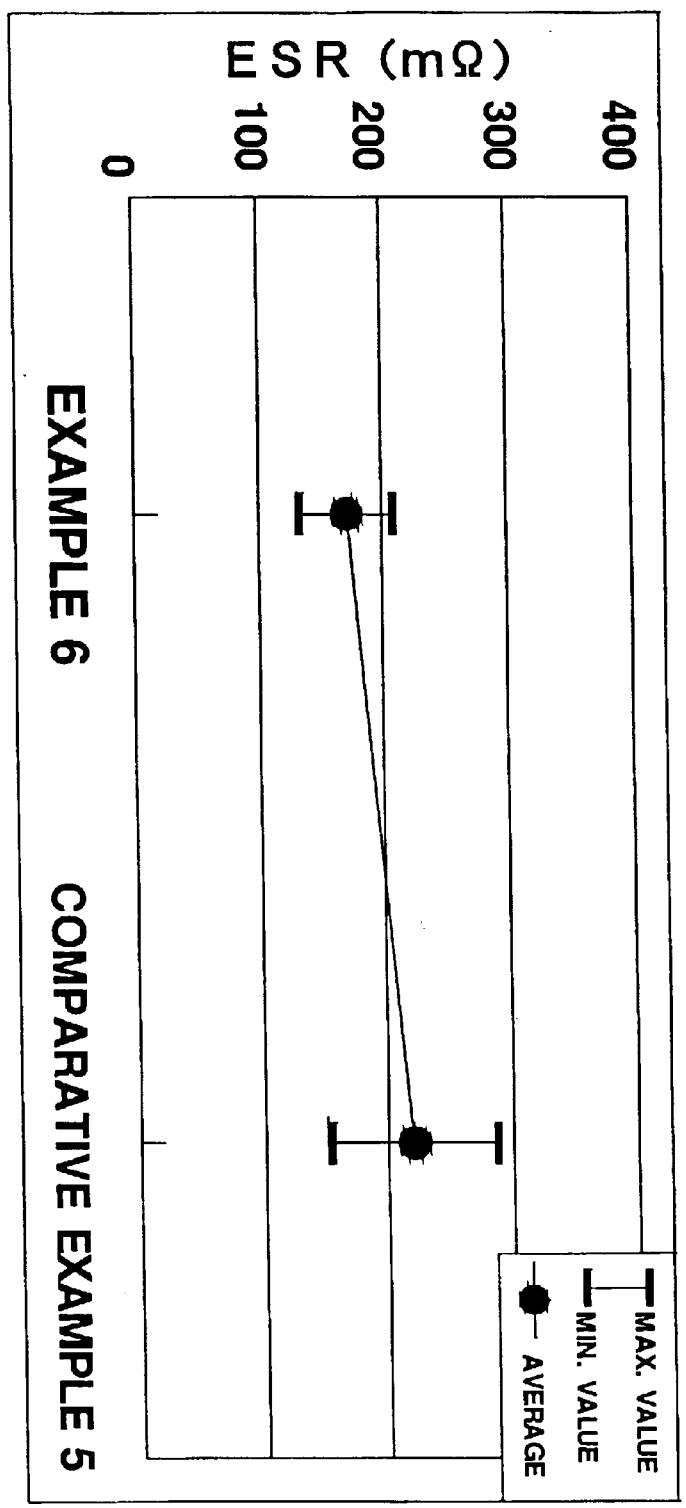
FIG. 5 is a graph showing the relationship between the type of a binder resin for a conductive bond layer and the initial ESR in the electric double-layer capacitor according to the present invention.

Results of the measurement of the durability ESR are shown in FIG. 5, and results of the measurement of the durability ESR are shown in Table 7.

The initial ESR was 200 mΩ or less in the sample in Example 6, but exceeded 200 mΩ in the sample in Comparative example 5.

Thus, the sample in Example 6 was little varied in durability ESR and showed an excellent performance, but the sample in Comparative example 5 showed a variation rate more than 6 times.

TABLE 7

| | Example 6 | Comparative example 5 |
|---|---|---|
| Long-term reliability test | S (1.03) | D (6.55) |
| Temperature cycle test | S (1.09) | D (8.16) |

Estimation 5

The initial ESR was measured for the samples (number of 100 for one condition) in Comparative examples 6 and 7.

Figure 6:
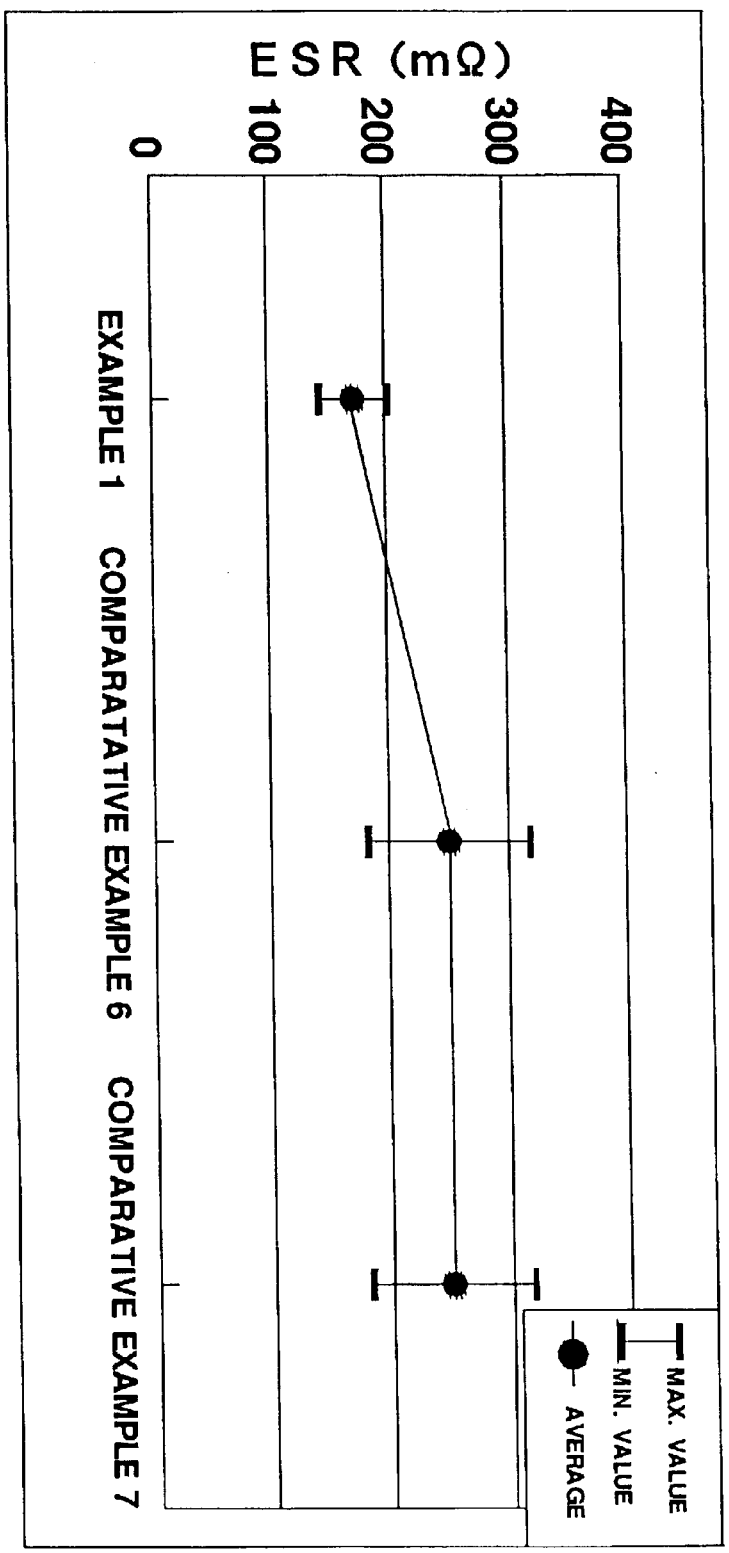
FIG. 6 is a graph showing the relationship between the face bonded to a collector in a process for producing an electric double-layer capacitor according to the present invention and the initial ESR.

Results of this measurement of the initial ESR are shown in FIG. 6 in comparison with the result in Example 1.

The average value exceeded 200 mΩ in both of Comparative examples 6 and 7.

Estimation 6: Relationship Between Pressing Force in Pressing Treatment and Electric Double-Layer Capacitor The initial ESR was measured for the samples (number of 100 for one condition) in Examples 7, 8 and 9 and Comparative examples 8 and 9.

Figure 7:
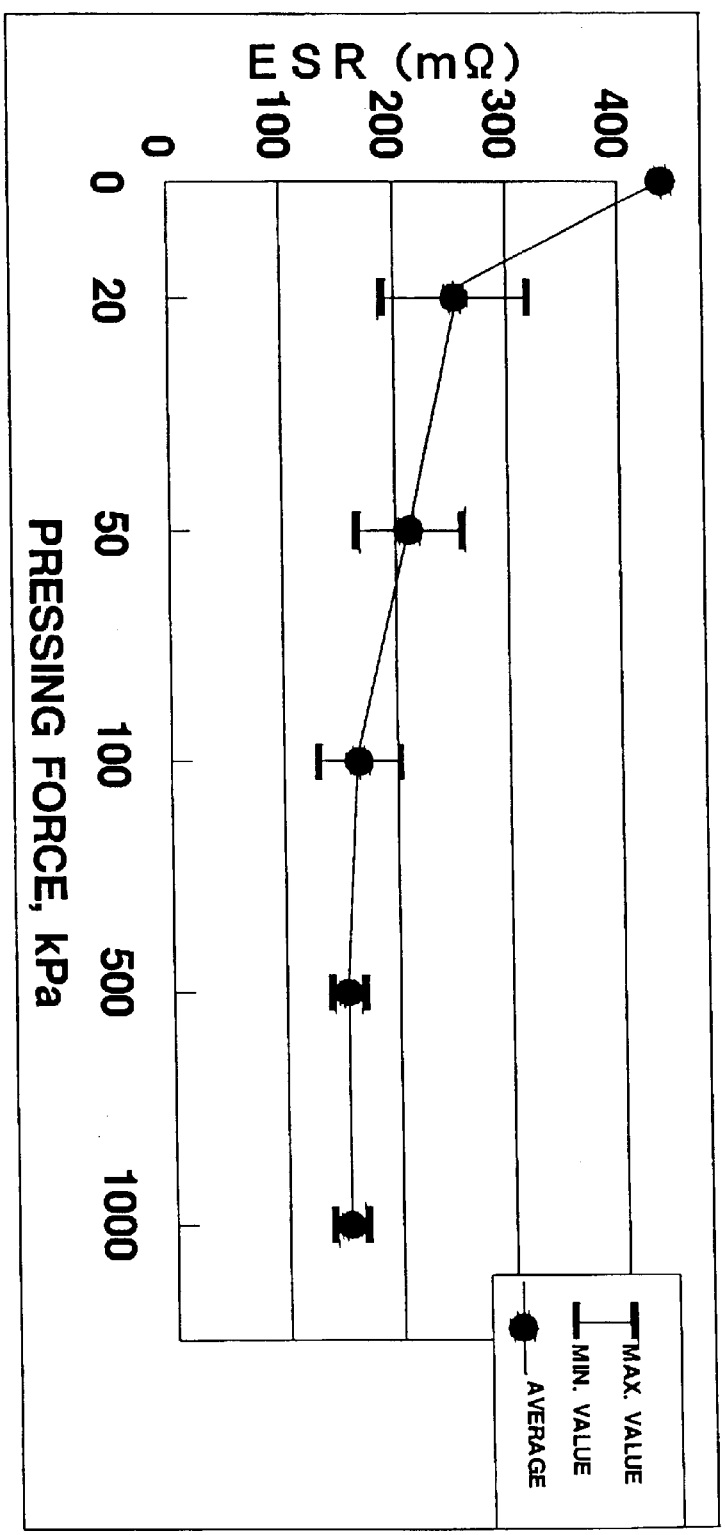
FIG. 7 is a graph showing the relationship between the pressing force in a pressing treatment in the process for producing the electric double-layer capacitor according to the present invention and the initial ESR.

Results of the measurement of the initial ESR are shown in FIG. 7.

The initial ESR is larger than 400 mΩ in Comparative example 8, but the average value is lower than 300 mΩ in Example 8. This means that the interfacial portions of the collectors or the interfacial portions of the collector and the conductive bond layer flow relative to each other as a result of the pressing, whereby voids present in each of the interfaces are eliminated.

A rejection rate of liquid leakage in each of the basic cells was evaluated for the examples (number of 100 for one condition) in Examples 7, 8 and 9 and Comparative examples 8 and 9. The term "liquid leakage" indicates that the electrolytic solution in the basic cell is leaked out of the cell.

Figure 8:
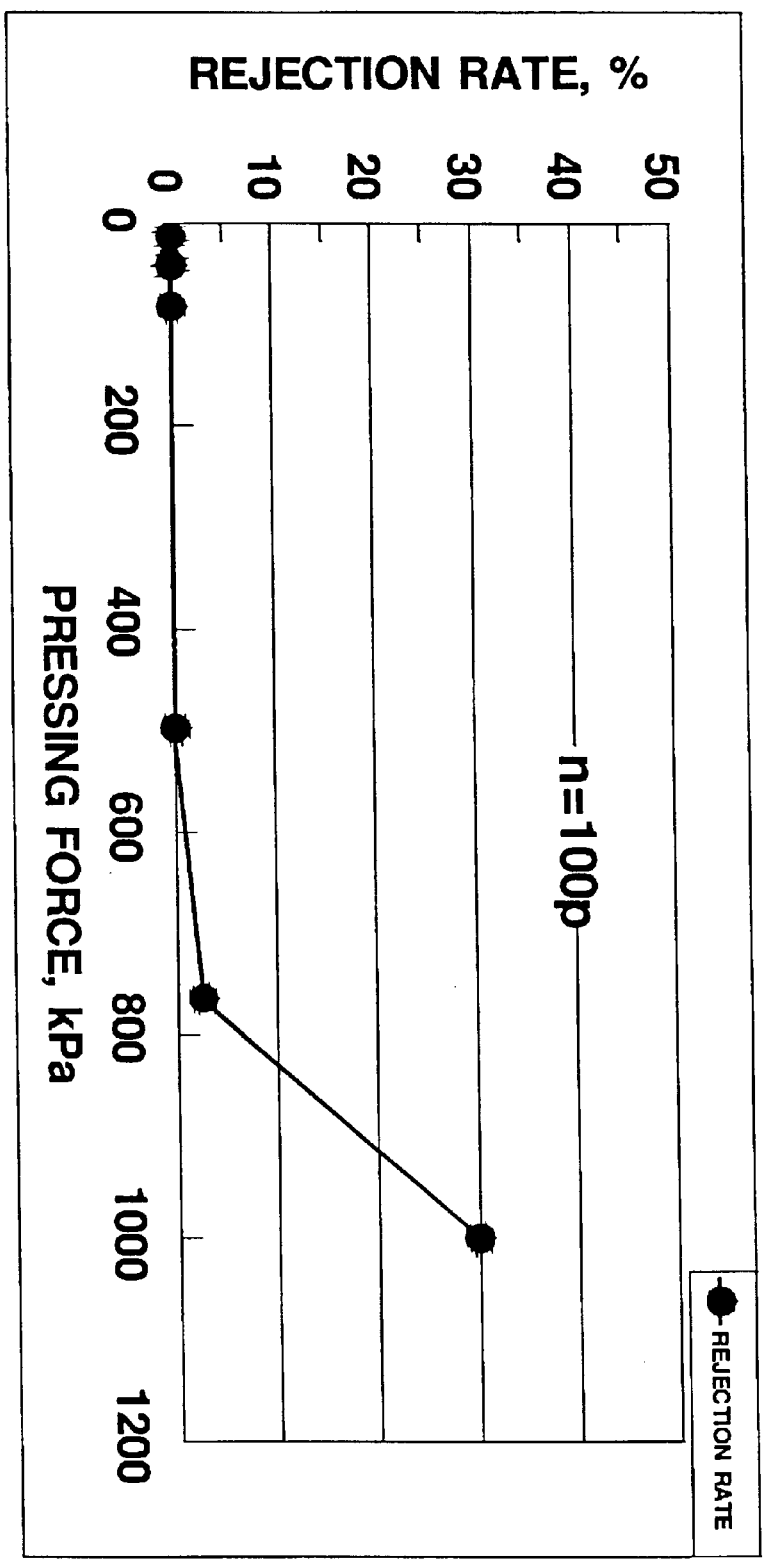
FIG. 8 is a graph showing the relationship between the pressing force and the rejection rate in the process for producing the electric double-layer capacitor according to the present invention.

Results of the evaluation are shown in FIG. 8.

When the pressing force exceeded 500 kPa, the liquid leakage rejection occurred in some of the capacitors. However, the remaining capacitors were acceptable products, because the liquid leakage did not occur.

Although the embodiments of the present invention have been described in detail, it will be understood that the present invention is not limited to the above-described embodiments, and various modifications in design may be made without departing from the spirit and scope of the invention defined in claims.

What is claimed is:

1. An electric double-layer capacitor comprising
   a cell structure constituted by laminating basic cells in series with their collectors serving as connections, each of said basic cells including a pair of collectors, a separator disposed between the collectors, and a pair of polarizable electrodes which are disposed between said collectors and said separator and in which an electrolytic solution is contained; and
   lead terminal/electrode plate assemblies each having an electrode plate electrically connected to said collectors at opposite ends of said cell structure,
   each of said collectors including a matrix made of an elastomer having a hardness Hs in a range of about 55 (inclusive) to lower than about 85 at ambient temperature, and conductive particles dispersed in said matrix.

2. An electric double-layer capacitor according to claim 1, further including a conductive bond layer which is disposed between each of the collectors at opposite ends of said cell structure and each of said electrode plates, and which includes a matrix made of an elastomer having a hardness Hs at ambient temperature in a range of about 60 (inclusive) to lower than about 85, and conductive particles dispersed in said matrix.

3. An electric double-layer capacitor according to claim 2, wherein a difference between the hardness Hs of the matrix of said collector at ambient temperature and the hardness Hs of the matrix of said conductive bond layer at ambient temperature is smaller than about 30.

4. An electric double-layer capacitor according to claim 2, wherein a starting material for the matrix of said conductive bond layer includes a fluoro-elastomer.

5. An electric double-layer capacitor, comprising
   a basic cell including includes a pair of collectors, a separator disposed between the collectors, and a pair of polarizable electrodes which are disposed between said collectors and said separator and in which an electrolytic solution is contained; and
   lead terminal/electrode plate assemblies each including an electrode plate electrically connected to each of said collectors of said basic cell;
   said collector including a matrix formed of an elastomer having a hardness Hs in a range of about 55 (inclusive) to lower than 85 at ambient temperature, and conductive particles dispersed in the matrix, and a conductive bond layer being interposed between each of said electrode plates and each of said collectors electrically connected to said electrode plate, said conductive bond layer including a matrix formed of an elastomer having a hardness Hs in a range of about 60 (inclusive) to lower than 85 at ambient temperature, and conductive particles dispersed in the matrix.

6. An electric double-layer capacitor according to claim 5, wherein a difference between the hardness Hs of the matrix of said collector at ambient temperature and the hardness Hs of the matrix of said conductive bond layer at ambient temperature is smaller than about 30.

7. An electric double-layer capacitor according to claim 5, wherein a starting material for the matrix of said conductive bond layer includes a fluoro-elastomer.

* * * * *